(12) United States Patent
Bernhard (10) Patent No.: US 8,043,053 B2
(45) Date of Patent: Oct. 25, 2011

(54) SELF LOCKING TRIM TAB (75) Inventor: Andreas Bernhard, Shelton, CT (US)

(73) Assignee: Sikorsky Aircraft Corporation, Stratford, CT (US)

( * ) Notice: Subject to any disclaimer, the term of this patent is extended or adjusted under 35 U.S.C. 154(b) by 976 days.

(21) Appl. No.: 11/962,257

(22) Filed: Dec. 21, 2007

(65) Prior Publication Data
US 2009/0162199 A1 Jun. 25, 2009

(51) Int. Cl.
*B64C 3/52* (2006.01)

(52) U.S. Cl. .......... 416/1; 416/23; 416/24; 416/31; 416/98; 416/104; 416/132 R; 416/132 A; 415/148; 60/527

(58) Field of Classification Search ........... 416/1, 23, 416/24, 31, 98, 104, 132 R, 132 A; 415/148; 60/527
See application file for complete search history.

(56) References Cited

U.S. PATENT DOCUMENTS

| | | | |
|---|---|---|---|
| 4,461,611 A | 7/1984 | Michael | |
| 4,806,077 A | 2/1989 | Bost | |
| 5,111,676 A | 5/1992 | Ruzicka, Jr. et al. | |
| 5,492,448 A | 2/1996 | Perry et al. | |
| 6,322,324 B1 | 11/2001 | Kennedy et al. | |
| 6,453,669 B2 | 9/2002 | Kennedy et al. | |
| 6,644,081 B1 | 11/2003 | Berry | |
| 6,940,186 B2 | 9/2005 | Weitkamp | |
| 6,942,455 B2 | 9/2005 | Schmaling et al. | |
| 7,083,383 B2 | 8/2006 | Loftus et al. | |
| 7,143,711 B1 | 12/2006 | Wolske | |
| 7,165,746 B2 | 1/2007 | Audren | |
| 2004/0056751 A1* | 3/2004 | Park et al. | 337/139 |
| 2004/0261411 A1* | 12/2004 | MacGregor | 60/527 |
| 2005/0150223 A1* | 7/2005 | Rey et al. | 60/527 |
| 2007/0016062 A1* | 1/2007 | Park et al. | 600/459 |

OTHER PUBLICATIONS

Search Report for International Application No. PCT/US2008/078064 dated May 22, 2009.

* cited by examiner

*Primary Examiner* — Igor Kershteyn (74) *Attorney, Agent, or Firm* — Carlson Gaskey & Olds, P.C.

(57) ABSTRACT

A trim tab assembly includes first and second shape memory alloy (SMA) actuators and a trim tab substrate which provide elastic/plastic locking in response to an induced strain actuation.

20 Claims, 7 Drawing Sheets

TAB SUBSTRUCTURE

FIG. 4A

TAB UP
SMA ACTUATOR

FIG. 4B

TAB DOWN
SMA ACTUATOR

SELF LOCKING TRIM TAB

BACKGROUND OF THE INVENTION

The present invention relates to a rotor blade trim tab, and more particularly to a self locking trim tab.

A rotary wing aircraft typically utilizes multiple rotor blades mounted to a rotor hub. A trim tab extends from the trailing edge of the rotor blade. The trim tab can be bent along its length about a spanwise axis to change the effective airfoil shape and thus change the lift, drag, and pitching-moment coefficients of the rotor blade airfoil at the local spanwise position of the tab. The ability to adjust these local airfoil parameters increases the amount of adjustment available to control global blade characteristics such as pitching moment slope, track, flutter stability, vibrations, and bending mode shapes.

Conventional trim tabs are readily adjustable in a field environment through a hand-held tool. Sections of the tab are manually bent by the operator applying force to the extending handle to set a portion of the trim tab. Each successive trim tab portion so bent is separately measured to determine the degree of bending. Other more sophisticated tools may also be utilized. Although effective, trim tab adjustment may be relatively time consuming even with the appropriate tools.

Trim tabs must hold a set to maintain an adjusted position relative to the rotor blade, provide an acceptable aerodynamic surface, and survive the high-strain environment found at the trailing edge of a rotor blade.

Accordingly, it is desirable to provide a rotor blade trim tab that is readily set without tools yet will maintain the adjusted position relative to the rotor blade.

SUMMARY OF THE INVENTION

A trim tab assembly according to an exemplary aspect of the present invention generally includes an upper and lower doubler, an upper and lower shape memory alloy (SMA) actuator and a trim tab substrate. When either the first SMA actuators or the second SMA actuators are activated the non-activated SMA actuators are plastically deformed to lock the trim tab assembly in a desired position. The trim tab substrate alternatively or additionally further facilitates permanent set of the trim tab assembly in a desired position.

The trim tab assembly is positioned in response to a controller which drives a power source to selectively activate the particular first SMA actuators and the second SMA actuators. The trim tab assembly is flexed through elastic strain and into plastic strain such that the trim tab assembly locks the desired position after some elastic spring back. That is, the trim tab assembly is flexed past the desired final position by the appropriate SMA actuators to account for elastic spring back to the desired final position.

In operation, the particular SMA actuators are activated to adjust the trim tab assembly toward a desired flexed position. When the particular SMA actuators are activated, the unactivated SMA actuators flex with the trim tab substrate (if utilized in the particular embodiment) into a plastic deformation range and past a desired final adjusted position to an intermediate position. The activated SMA actuators may remain activated for a period of time then turned-off to permit the trim tab assembly to spring back to the final adjusted position.

The present invention therefore provides a rotor blade trim tab that is readily set without tools yet will maintain the adjusted position relative to the rotor blade.

BRIEF DESCRIPTION OF THE DRAWINGS

The various features and advantages of this invention will become apparent to those skilled in the art from the following detailed description of the currently disclosed embodiment. The drawings that accompany the detailed description can be briefly described as follows.

DETAILED DESCRIPTION OF THE DISCLOSED EMBODIMENT

Figure 1:
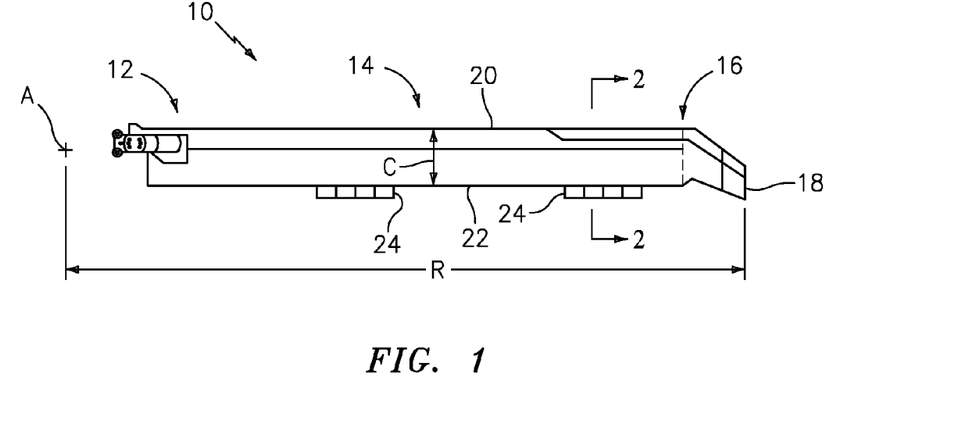
FIG. 1 is a top plan view of an exemplary main rotor blade assembly.

FIG. 1 schematically illustrates an exemplary main rotor blade 10 mounted to a rotor hub assembly (not shown) for rotation about an axis of rotation A. The main rotor blade 10 includes an inboard section 12, an intermediate section 14, and an outboard section 16. The inboard, intermediate, and outboard sections 12, 14, 16 define a blade radius R between an axis of rotation A and a blade tip 18. The main rotor blade 10 has a leading edge 20 and a trailing edge 22, which define the chord C of the main rotor blade 10. Adjustable trim tabs 24 extend rearwardly from the trailing edge 22.

Figure 2:
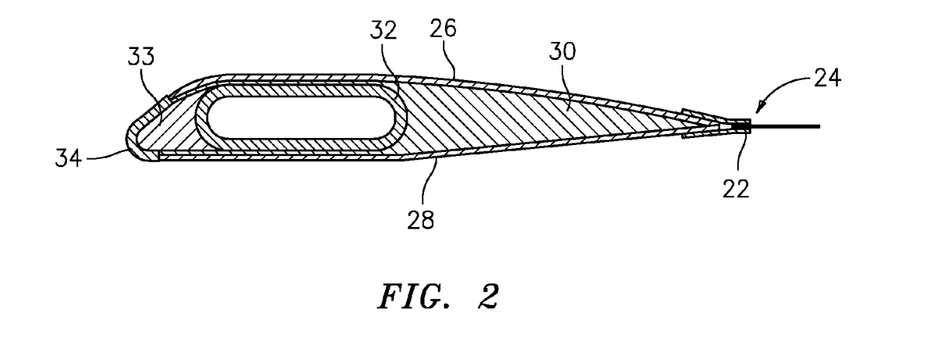
FIG. 2 is a cross-sectional view of the main rotor blade of FIG. 1 taken along line 2-2 thereof.

Referring to FIG. 2, upper and lower skins 26, 28 define the upper and lower aerodynamic surfaces of the main rotor blade 10. A honeycomb core 30, a spar 32, one or more counterweights 33, and a leading-edge sheath 34 typically form the interior support for the skins 26, 28 of the main rotor blade 10. It should be understood that relative positional terms such as "forward," "aft," "upper," "lower," "above," "below," and the like are with reference to the normal operational attitude of the vehicle and should not be considered otherwise limiting.

Figure 3A:
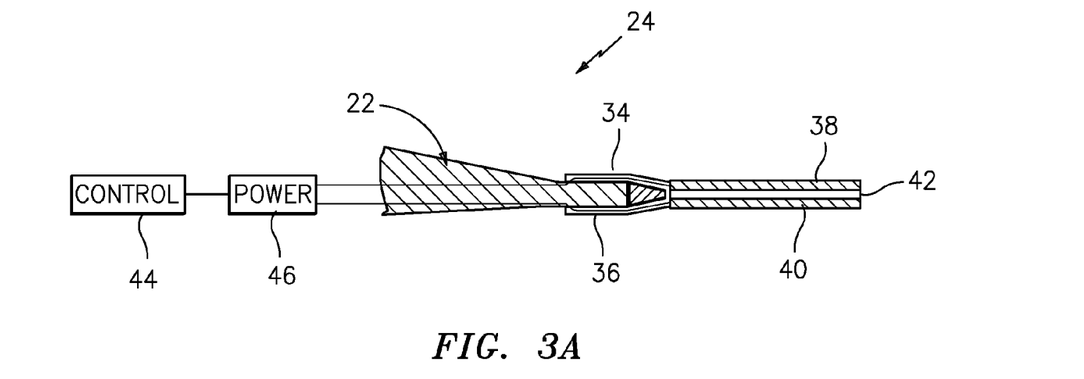
FIG. 3A is an expanded view of a trim tab assembly.

Referring to FIG. 3A, an expanded view of the trailing edge 22 and the trim tab assembly 24 is illustrated. The trim tab assembly 24 generally includes an upper and lower doubler 34, 36 a first and second shape memory alloy (SMA) actuator 38, 40 and a trim tab substrate 42 between the SMA actuators 38, 40. SMA as utilized herein may include one of several induced strain actuation mechanisms such as elastic/plastic locking, piezeceramic, magnetostrictive, general SMA, bi-directional SMA, induced strain actuation mechanisms that require a zero-power or power-off locking mechanism, and other induced strain actuation concepts. The SMA actuators 38, 40 may be manufactured from temperature-dependent martensitic-to-austenitic phase transformation materials that transition from a low-symmetry to a high symmetry crystallographic structure in response to heating (resistive or other) such as a copper-zinc-aluminum, copper-aluminum-nickel, and nickel-titanium (NiTi) alloys.

The trim tab substrate 42 may be manufactured of a metal such as aluminum or a composite material which exhibits elastic/plastic stress/strain characteristics, for example, a composite with a metallic layer to generally define the aerodynamic portion of the tab assembly 24. The trim tab assembly 24 is positioned in response to a controller 44 which drives a power source 46 to selectively activate either or both of the first SMA actuators 38 and the second SMA actuators 40.

Figure 3B:
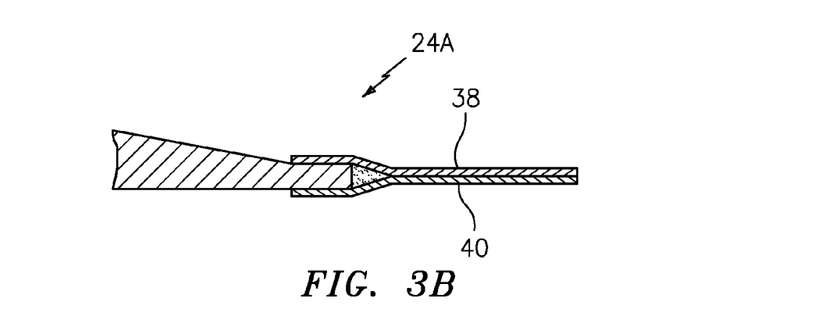
FIG. 3B is an expanded view of another trim tab assembly.
Figure 3C:
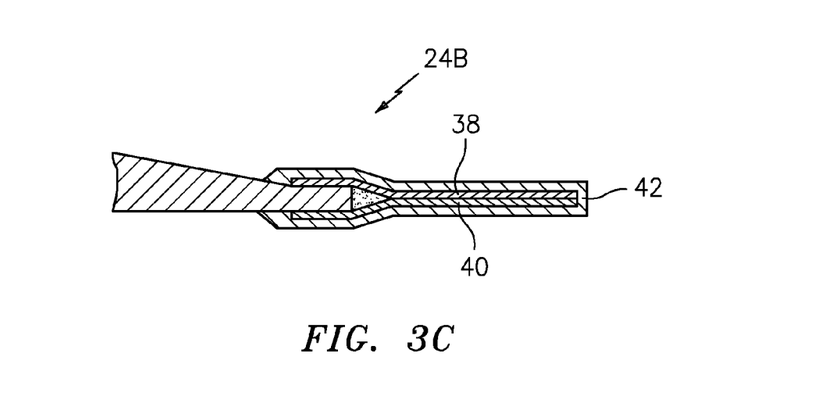
FIG. 3C is an expanded view of another trim tab assembly.
Figure 3D:
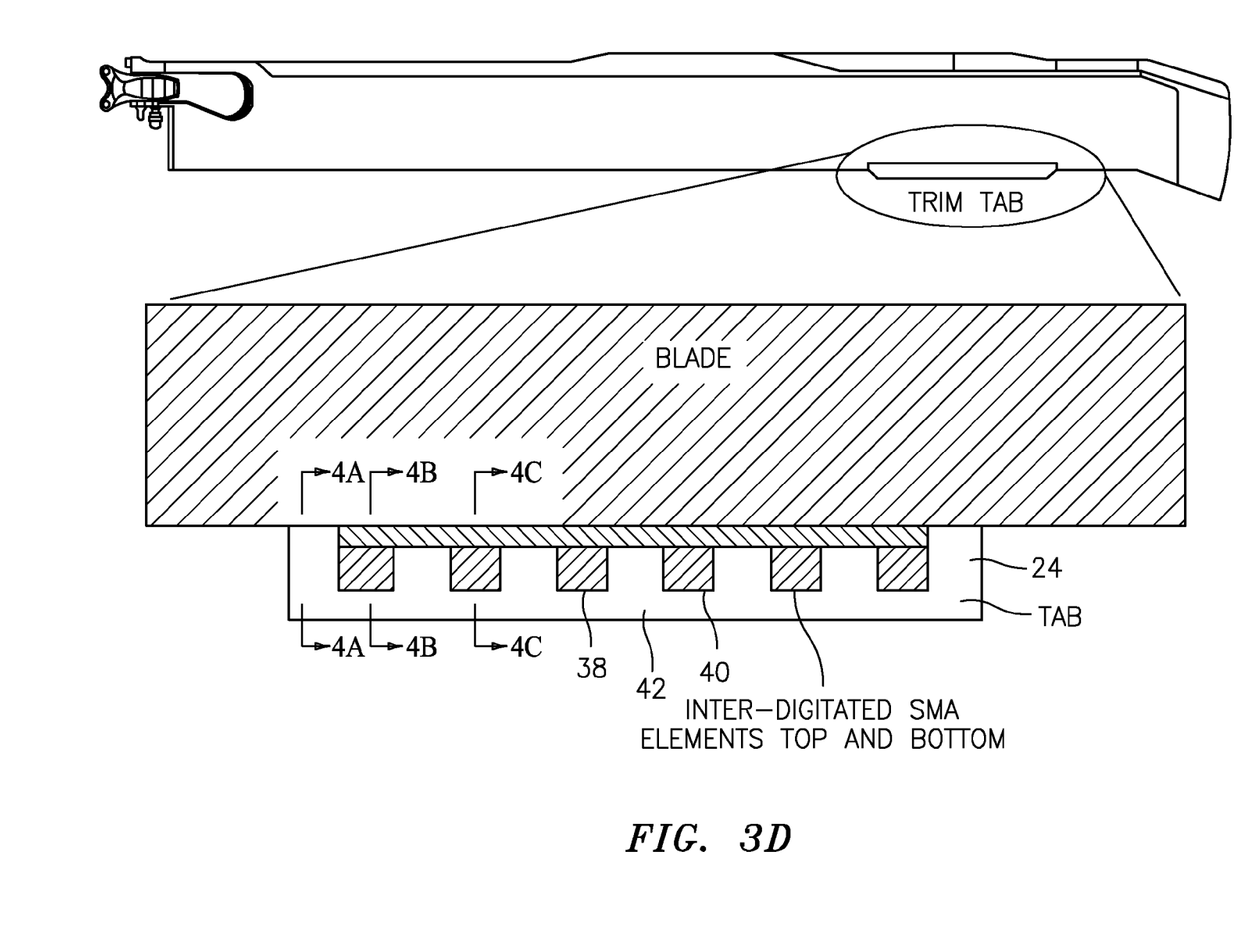
FIG. 3D is an expanded plan view of another trim tab assembly.

In another non-limiting embodiment, the first and second SMA actuators 38, 40 are directly adjacent each other to form the trim tab assembly 24A without the intermediate trim tab substrate 42 (FIG. 3B). In still another embodiment, the first and second SMA actuators 38, 40 are located within the intermediate trim tab substrate 42 (FIG. 3C) to form the trim tab assembly 24B. It should be understood that various materials may be utilized to form the trim tab substrate 42 as the trim tab substrate 42 may be utilized to facilitate positioning of the trim tab assembly 24 (FIG. 3B) and may alternatively or additionally encase the SMA actuators 38, 40 therein (FIG. 3C). As such, appropriate materials may be utilized therefor—typically aluminum for intermediate material and a flexible composite for encasement material. In still another embodiment, the first SMA actuators 38 and the second SMA actuators 40 inter-digitated along the length of the trim tab assembly 24 (FIG. 3D) to form the trim tab assembly 24. Inter-digitation provides opportunities for redundancy, fine tuning and uniform versus multi-spanwise deformation which facilitated inter-digitation operation in which only a subset of the trim tab assembly 24 are operated.

Figure 4A:
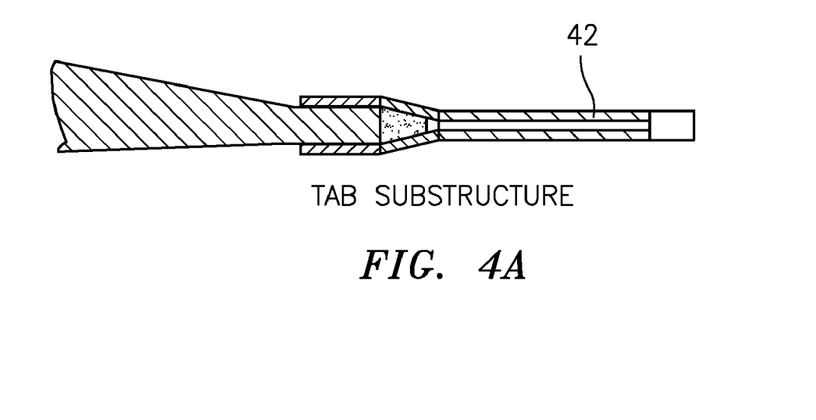
FIG. 4A is an expanded view of a trim tab assembly in an unactivated position.
Figure 4B:
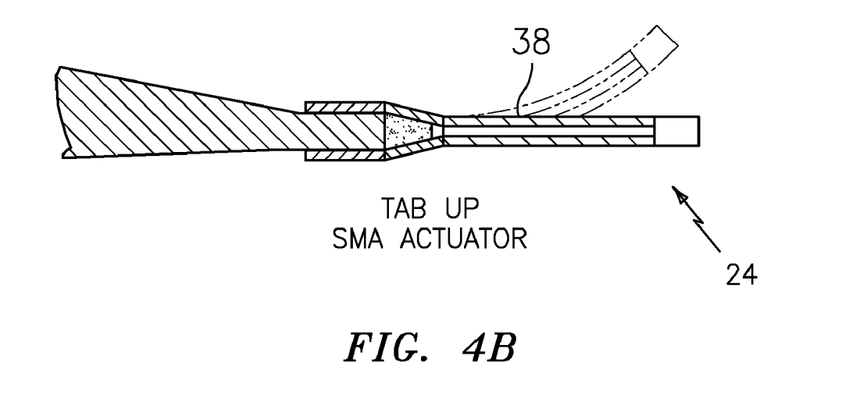
FIG. 4B is an expanded view of a trim tab assembly in an activated position.
Figure 4C:
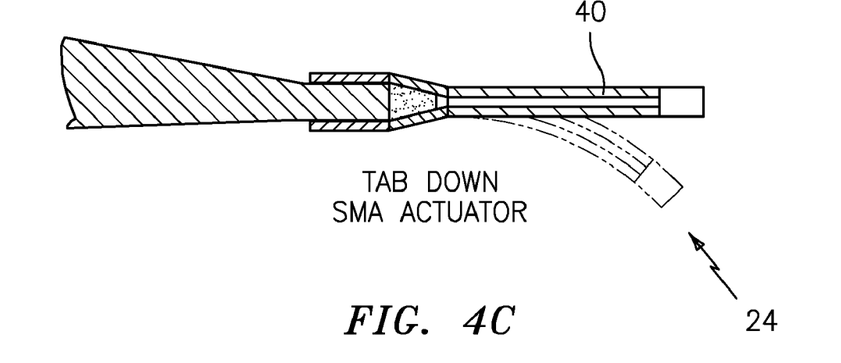
FIG. 4C is an expanded view of a trim tab assembly in an activated position.

When activated, the first SMA actuator 38 generally flexes the trim tab assembly 24 in an upward direction relative the blade trailing edge 22 (FIGS. 4A, 4B). Conversely, the second SMA actuator 40 generally flexes the trim tab assembly 24 in a downward direction when activated (FIGS. 4A, 4C). It should be understood that the first SMA actuator 38 and the second SMA actuator 40 may be unidirectional or bidirectional in operation.

When either the first SMA actuator 38 or the second SMA actuator 40 are activated the unactivated SMA actuators are flexed through an elastic deformation range and into a plastic deformation range to lock the trim tab assembly 24 in the desired position. The trim tab substrate 42 alternatively or additionally facilitates retention of the trim tab assembly 24 in the flexed position. The first SMA actuator 38 or the second SMA actuator 40 is activated to position the non-activated first SMA actuator 38, or second SMA actuator 40 as well as the trim tab substrate 42. That is, either the opposing SMA actuators 38, 40 and/or the substrate 42 may undergo plastic deformation.

Figure 5A:
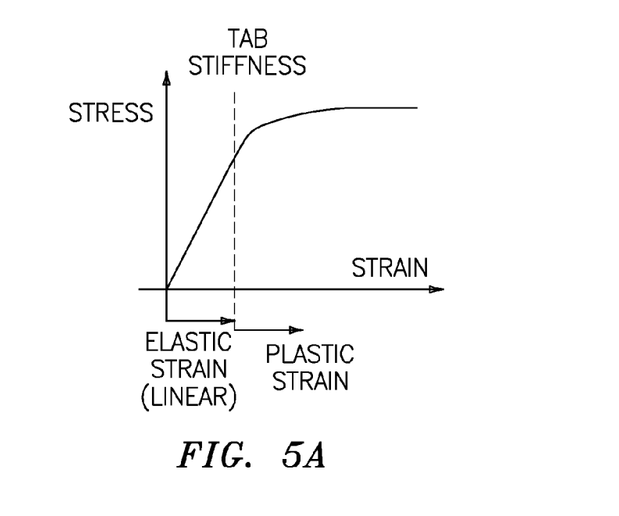
FIG. 5A is a stress vs. strain graph for a trim tab assembly.
Figure 5B:
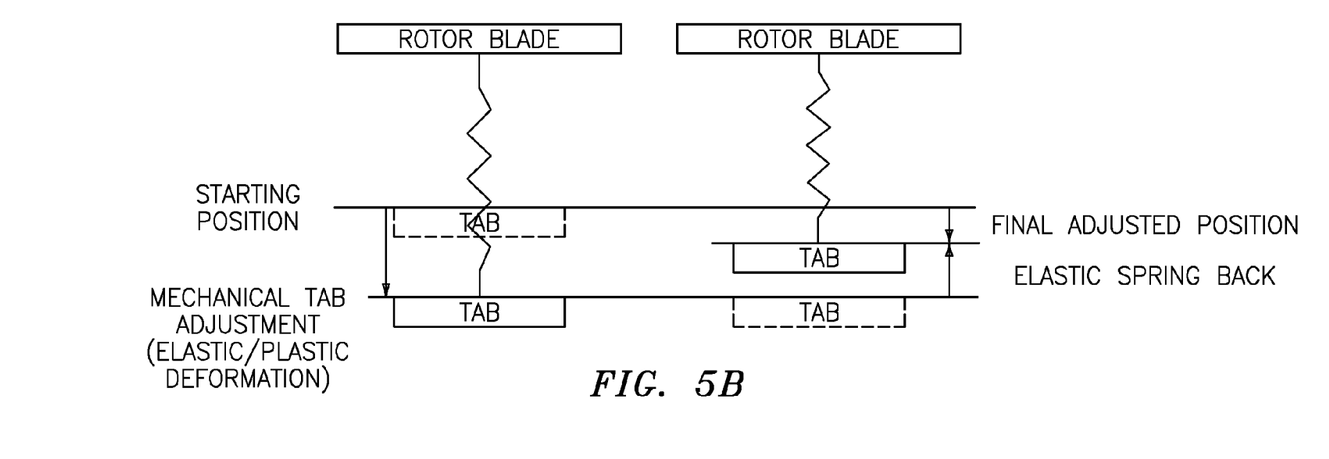
FIG. 5B is a block diagram of the trim tab assembly.

The trim tab assembly 24 is flexed through elastic strain and into plastic strain (FIG. 5A) such that the trim tab assembly 24 is positioned to the desired position after some elastic spring back (FIG. 5B). That is, the trim tab assembly 24 may be flexed past the desired final position by appropriate activation of the SMA actuators 38, 40 to account for elastic spring back to the desired final position. Generally, there are three structural elements in operation: the active SMA element, the passive SMA element and the passive substrate. When actuated, the SMA effect in the active SMA element generates an induced strain or actuation strain. This actuation strain tends to deform the active SMA element and is resisted by the passive SMA and substrate. The end result is an equilibrium deformation wherein the SMA actuation is balanced by the passive SMA element and the passive substrate which are thereby plastically deformed.

The input to the first SMA actuator 38 and the second SMA actuator 40 are provided by the controller 44 to achieve the desired final position. It should be understood that various final positions relative various starting positions are determined by the controller 44. It should also be understood that although the first SMA actuators 38 are illustrated as being activated to flex the trim tab assembly 24 in an upward direction, and the second SMA actuators 40 are activated to flex the trim tab assembly 24 in a downward direction, this is for simplified descriptive purposes only and the reverse as well as other activation schemes, both full and proportional may likewise be utilized herewith. Desired trim tab assembly 24 position may be achieved during flight or on the ground.

Figure 6A:
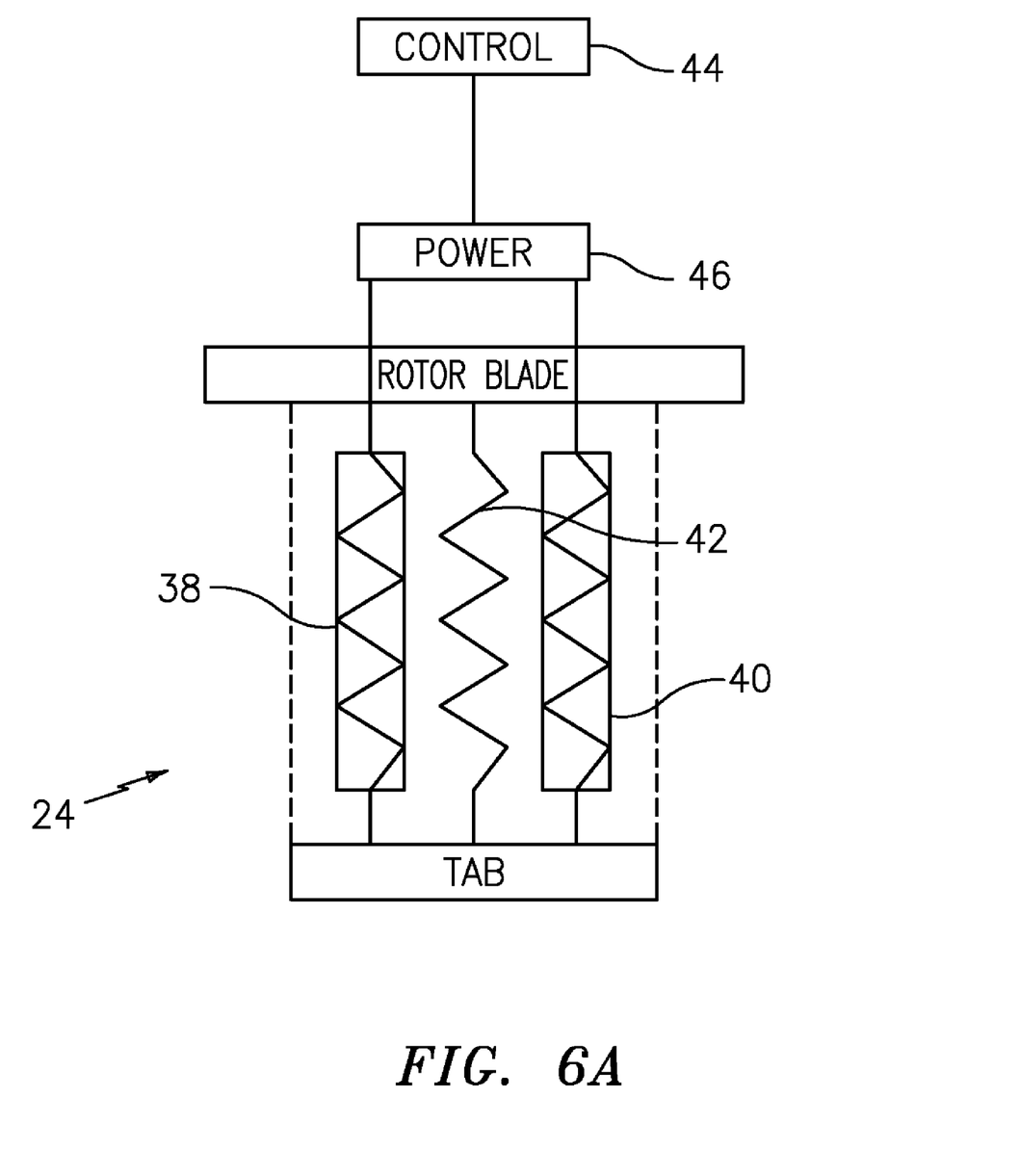
FIGS. 6A-6C is a schematic block diagram representation of a trim tab position change.
Figure 6B:
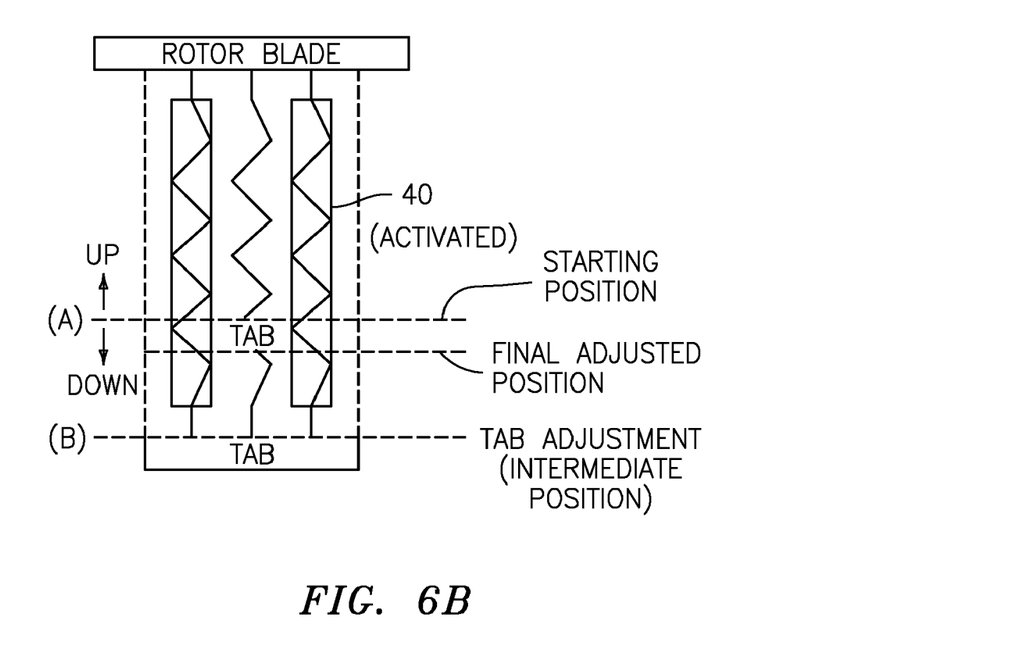
Figure 6C:
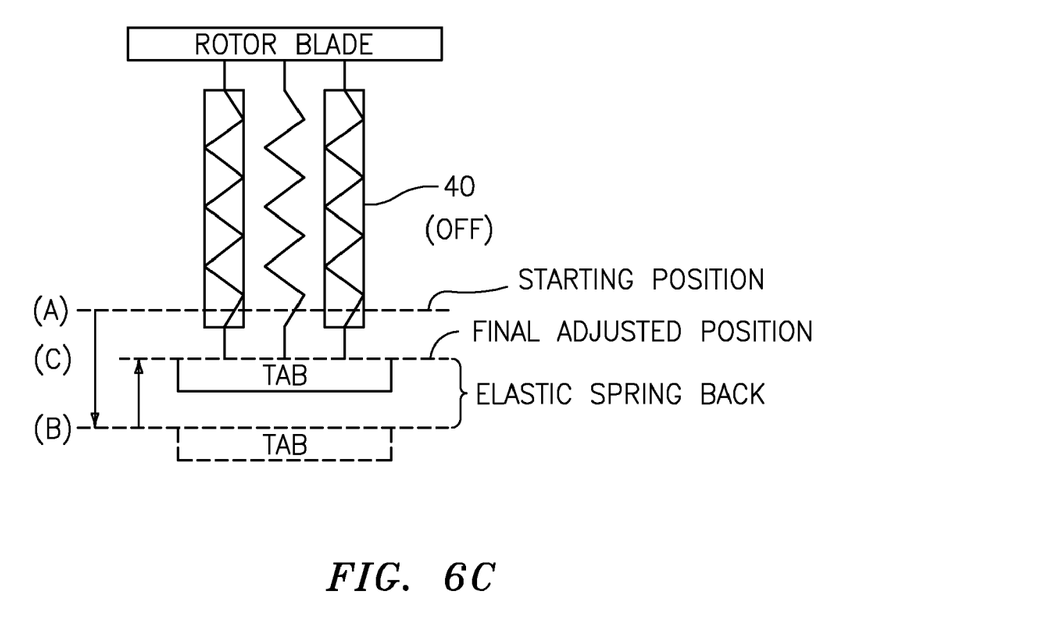

Referring to FIG. 6A, the trim tab assembly 24 is schematically illustrated for operational example. In operation, the second SMA actuators 40 are actuated to adjust the trim tab assembly 24 to a downwardly flexed position. When the second SMA actuators 40 are activated (FIG. 6B), the second SMA actuators 40 flex the first SMA actuators 38 and the trim tab substrate 42 (if utilized in the particular embodiment) past the desired final adjusted position to an intermediate portion. The second SMA actuators 40 may remain actuated for a period of time then turned-off to permit the trim tab assembly 24 to spring back to the final adjusted position. That is, non-activated SMA actuator 38 and the trim tab substrate 42 (if utilized in the particular embodiment) will spring-back to some extent to achieve the desired final adjusted position. Again, the intermediate portion and the time at the intermediate portion to achieve the desired final adjusted position are achieved by the controller 44. Notably, power need not be provided once the new final adjusted position is achieved.

Although a particular helicopter configuration is illustrated and described in the disclosed embodiment, other configurations and/or machines, such as high speed compound rotary wing aircraft with supplemental translational thrust systems, dual contra-rotating, coaxial rotor system aircraft, turbo-props, tilt-rotors and tilt-wing aircraft, will also benefit from the present invention.

It should be understood that relative positional terms such as "forward," "aft," "upper," "lower," "above," "below," and the like are with reference to the normal operational attitude of the vehicle and should not be considered otherwise limiting.

It should be understood that although a particular component arrangement is disclosed in the illustrated embodiment, other arrangements will benefit from the instant invention.

Although particular step sequences are shown, described, and claimed, it should be understood that steps may be performed in any order, separated or combined unless otherwise indicated and will still benefit from the present invention.

The foregoing description is exemplary rather than defined by the limitations within. Many modifications and variations of the present invention are possible in light of the above teachings. The disclosed embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:
1. A trim tab assembly comprising:
a first shape memory alloy (SMA) actuator; and
a second SMA actuator, activation of said first SMA actuator operable to flex said second SMA actuator through an elastic range of strain and into a plastic range of strain to position a trim tab substrate.
2. The trim tab assembly as recited in claim 1, wherein said first SMA actuator and said second SMA actuator are directly adjacent to each other.
3. A trim tab assembly comprising:
a first shape memory alloy (SMA) actuator;

a second SMA actuator, activation of said first SMA actuator operable to flex said second SMA actuator through an elastic range of strain and into a plastic range of strain; and a trim tab substrate between said first SMA actuator and said second SMA actuator.

4. The trim tab assembly as recited in claim 3, wherein said trim tab substrate operates through elastic/plastic strain ranges.

5. A trim tab assembly comprising:
a first shape memory alloy (SMA) actuator;
a second SMA actuator, activation of said first SMA actuator operable to flex said second SMA actuator through an elastic range of strain and into a plastic range of strain
a trim tab substrate, said first SMA actuator and said second SMA actuator located within said trim tab substrate.

6. The trim tab assembly as recited in claim 1, wherein said first SMA actuator and said second SMA actuator are alternating segments.

7. A trim tab assembly comprising:
a first shape memory alloy (SMA) actuator;
a second SMA actuator, activation of said first SMA actuator operable to flex said second SMA actuator through an elastic range of strain and into a plastic range of strain; and
a power source which selectively activates said first SMA actuator to cause flexion from an initial position to an intermediate position past a desired final adjusted position, said final adjusted position held without application of power from said power source.

8. The trim tab assembly as recited in claim 1, wherein at least one of said first SMA actuator and said second SMA actuator are configured to be actuated bidirectionally.

9. The trim tab assembly as recited in claim 1, wherein said second SMA actuator is configured to be actuated bidirectionally.

10. The trim tab assembly as recited in claim 1, wherein said first SMA actuator and said second SMA actuator are unidirectional, said first SMA actuator activatable toward a first direction and said second SMA actuator activatable in a second direction different than said first direction.

11. A rotor blade assembly for a rotary wing aircraft comprising:
an upper skin and a lower skin which defines a trailing edge of a rotor blade;
a first doubler attached to said upper skin;
a second doubler attached to said lower skin;
a trim tab substrate attached to said first doubler and said second doubler;
a first shape memory alloy (SMA) actuator mounted adjacent said trim tab substrate; and
a second SMA actuator adjacent said trim tab substrate, activation of said second SMA actuator operable to flex said first SMA actuator to an intermediate position past a desired final adjusted position.

12. The assembly as recited in claim 11, wherein said first SMA actuator and said second SMA actuator are located within said trim tab substrate.

13. The assembly as recited in claim 11, further comprising a power source which selectively activates said first SMA actuator and said second SMA actuator.

14. The assembly as recited in claim 11, wherein one of said first SMA actuator and said second SMA actuator is configured to be actuated bi-directionally.

15. The assembly as recited in claim 11, wherein both of said first SMA actuator and said second SMA actuator are configured to be actuated bi-directionally.

16. A method of positioning a trim tab assembly comprising the steps of:
(A) activating a shape memory alloy (SMA) actuator to flex a trim tab assembly from an initial position to an to an intermediate position that is past a desired final adjusted position; and
(B) deactivating the SMA actuator to permit the trim tab assembly to return to the desired final adjusted position.

17. A method as recited in claim 16, wherein said activating further comprises:
(a) flexing a non-activated second SMA actuator.

18. A method as recited in claim 16, wherein activating further comprises:
(a) flexing a trim tab substrate.

19. A method as recited in claim 16, wherein activating further comprises:
(a) flexing a non-activated second SMA actuator; and
(b) flexing a trim tab substrate.

20. A method as recited in claim 16, wherein activating further comprises:
(a) holding the trim tab assembly at the intermediate position for a time period.

* * * * *